A. DRUMMOND.
MANDREL AND ASSOCIATED MEMBERS OF LATHES.
APPLICATION FILED JULY 27, 1921.
1,415,229.   Patented May 9, 1922.
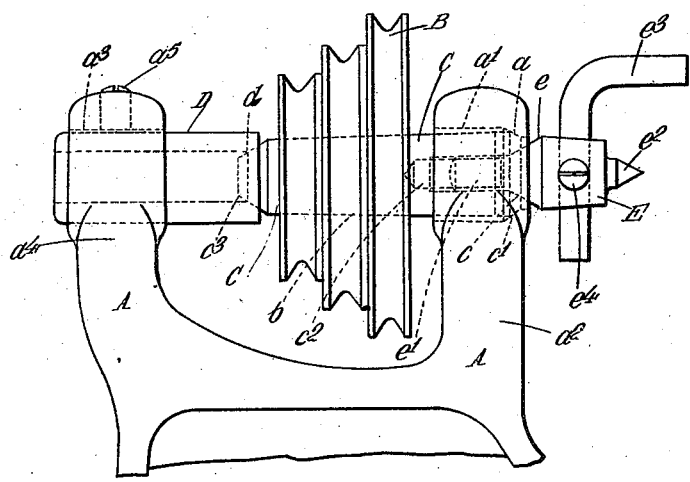

UNITED STATES PATENT OFFICE.

ARTHUR DRUMMOND, OF RYDE'S HILL, NEAR GUILDFORD, ENGLAND.

MANDREL AND ASSOCIATED MEMBERS OF LATHES.

1,415,229.  Specification of Letters Patent.  Patented May 9, 1922.

Application filed July 27, 1921. Serial No. 487,983.

(GRANTED UNDER THE PROVISIONS OF THE ACT OF MARCH 3, 1921, 41 STAT. L., 1313.)

*To all whom it may concern:*

Be it known that I, ARTHUR DRUMMOND, a subject of the King of Great Britain, residing at Ryde's Hill, near Guildford, in the county of Surrey, England, have invented certain new and useful Improvements in or Relating to the Mandrels and Associated Members of Lathes, (for which I have filed an application in Great Britain July 12, 1919, Patent No. 144,497,) of which the following is a specification.

This invention relates to the mandrels and associated members carried by the headstocks of lathes, the chief object of the invention being to economize in the manufacture of the parts and to allow them to be made in automatic lathes without any substantial additional labour.

According to this invention the mandrel is turned with a positive cone at each end to form bearing surfaces for seatings in the headstock and thrust pin or stops respectively, and is very slightly tapered along its length so that the pulley, which is formed with a correspondingly tapered hole, can be secured by simply driving it on the tapered mandrel. The mandrel is preferably turned in a turret or automatic lathe by tools which form internal and external conical surfaces and a tapped hole at the forward end of the mandrel, the tapped hole receiving the screwed stem of a chuck provided with a cone for which the internal cone of the mandrel forms a seating.

In order that the said invention may be clearly understood and readily carried into effect the same will now be described more fully with reference to the accompanying drawing, which shows in side elevation the headstock of a lathe provided with pulley, mandrel and chuck embodying this invention.

A is the headstock. B is the stepped pulley. C is the mandrel. D is the thrust pin for the mandrel. E is the chuck.

The mandrel C is turned as shown with a slightly conical surface tapering from the right hand end to the left hand end and the pulley B is made with a central hole $b$ having the same taper. The taper in both cases is slight, so that the pulley is firmly fixed on the mandrel by simply driving it on. The mandrel is turned in the lathe so as to form at the front end the internal and external or positive conical surfaces $c$ and $c'$ and the chuck E is made with a coned surface $e$ of the same angle as the internal cone $c$ and with a screwed stem $e'$ which screws into the tapped axial hole $c^2$ of the mandrel. The chuck is therefore secured firmly in position and in good alignment by simply screwing it into the end of the mandrel, the conical surfaces being readily turned with sufficient accuracy to ensure that the chuck and mandrel are coaxial, so that the center $e^2$ of the chuck is exactly in line with the mandrel axis. The chuck is formed with a transverse hole receiving the driving arm $e^3$ which is adjustable in the hole and secured by the screw $e^4$.

The conical surface $c'$ of the mandrel is pressed against an internal conical face $a$ at the end of the hole $a'$ in the right hand limb $a^2$ of the headstock A, the face $a$ being turned accurately to the same angle as the cone $c'$, the mandrel being held by the conical surfaces firmly in alignment. It is secured in place by means of the thrust pin D, which is slidably mounted in the hole $a^3$ in the upper end of the left hand limb $a^4$ of the headstock and is formed with an internal cone face $d$ against which bears the cone surface $c^3$ at the rear end of the mandrel C, the thrust pin being secured in place by the set screw $a^5$. The conical surface $c^3$ at the rear end of the mandrel is preferably produced by the parting off tool of the automatic lathe in which the mandrel is turned, the cone being truncated so as to extend through only part of the thickness of the mandrel, allowing it to be cut off from the bar on which it is turned without necessitating any accurate workmanship.

The holes $a'$ and $a^3$ in the two limbs of the headstock are bored coaxially by a single tool which is provided with a conical cutting end that does not pass completely through the forward limb but leaves the small conical surface $a$ to form the seating for the forward end of the mandrel. The alignment of the two holes is therefore ensured and consequently the alignment of the mandrel and associated parts.

In assembling the parts the mandrel C, with the pulley B fixed in position by a blow, is placed between the limbs $a^2$, $a^4$ of the headstock A and its forward end is pushed through the hole $a'$ in the inner limb $a^2$. The thrust pin D is then passed through the hole $a^3$ in the outer limb $a^4$ and pushed forward until the mandrel is firmly seated, but without undue pressure, in the conical seatings $a$, $d$ of the headstock limb and thrust pin, whereupon the latter is secured by the set screw $e^4$. The chuck E is screwed into the end of the mandrel and the lathe is then ready to receive the work.

What I claim and desire to secure by Letters Patent of the United States is:—

1. A lathe comprising a stepped pulley, a mandrel for said pulley provided with a positive bearing cone at each end and a taper along its length, and negatively coned seating members adapted to receive the positive bearing cones of said mandrel.

2. A lathe comprising a stepped pulley, a mandrel for said pulley provided with a positive bearing cone at each end and a taper along its length, negatively coned seating members adapted to receive the positive bearing cones of said mandrel, said stepped pulley being provided with a tapered hole adapted to fit and bind the tapered body of the mandrel.

3. A mandrel for the stepped pulleys of lathes, provided at each end with a truncated positive bearing cone, and at its forward end with an internally coned recess and an axial tapped hole at the inner end of the recess, for the purpose specified.

4. A mandrel for the stepped pulleys of lathes, provided at each end with a truncated positive bearing cone, and at its forward end with an internally coned recess, an axial tapped hole at the inner end of the recess, and a chuck provided with a coned surface fitting the internally coned recess of the mandrel, and with a screwed stem adapted to screw into the tapped hole of the mandrel.

5. In a lathe, a mandrel for the stepped pulley, having a positive bearing cone at each end and a very slight taper along its length, a headstock provided in its forward limb with a recess into which the forward end of the mandrel extends, said recess terminating in an internally coned portion fitting the forward bearing cone of the mandrel, and a thrust pin secured in the rear limb of the headstock and provided with an internally coned recess receiving the rear bearing cone of the mandrel, for the purpose specified.

ARTHUR DRUMMOND.